United States Patent [19]

Barkman et al.

[11] Patent Number: 4,794,223

[45] Date of Patent: Dec. 27, 1988

[54] SEAM TRACKING DEVICE FOR AN INDUSTRIAL ROBOT

[75] Inventors: Lars Barkman; Torbjörn Forss; Hakan Färdig; Tommy Svensson, all of Västerås, Sweden

[73] Assignee: ASEA Aktiebolag, Västerås, Sweden

[21] Appl. No.: 87,819

[22] Filed: Aug. 21, 1987

[30] Foreign Application Priority Data

Sep. 1, 1986 [SE] Sweden ............................ 8603655

[51] Int. Cl.$^4$ ............................................. B23K 9/12
[52] U.S. Cl. .......................... 219/124.34; 219/130.01; 901/42
[58] Field of Search ...................... 219/124.34, 130.01; 901/42

[56] References Cited

U.S. PATENT DOCUMENTS 4,501,950 2/1985 Richardson .................. 219/124.34

Primary Examiner—Clifford C. Shaw
Attorney, Agent, or Firm—Watson, Cole, Grindle & Watson

[57] ABSTRACT

A weld seam tracker for a welding robot has an optical sensor (4) for sensing the position of the seam and controlling the movement of a welding torch (10). The sensor (4) includes a light source, for example a laser, and a position-sensing detector. The sensor (4) is rotatably mounted at a housing (1) mounted on the robot hand (3) and is operated by a motor (6) arranged in the housing (1). A heat shield (40) with a window (42, 43) for the scanning light protects the sensor (4) against spatter and heat radiation. The welding torch (10) is mounted in a through-hole in the housing (1) and is surrounded by the sensor (4). Compressed air for cooling the sensor (4) is conducted to said sensor (4) via a gas-tight space (23) in the housing (1). Part of the cooling air is led out through a sleeve-formed screen (46) at the window (42, 43) of the heat shield (40), whereby fumes etc. are blown away from the visibility range located nearest the window.

10 Claims, 3 Drawing Sheets

SEAM TRACKING DEVICE FOR AN INDUSTRIAL ROBOT

TECHNICAL FIELD

The present invention relates to a seam tracking device for an industrial robot for carrying out, for example, a welding operation on a workpiece. The device comprises a welding torch, a sensor which is turnable in relation to the welding torch, and a motor for turning the sensor. The sensor comprises a light source for projecting a spot of light on the workpiece as well as optical members for reproducing the spot of light on a position-sensing detector. On its side facing the workpiece the sensor is provided with a heat shield in the form of a disc with a window for light emitted from the sensor and reflected back to the sensor.

BACKGROUND ART

A device of the above-mentioned kind is previously known from U.S. Pat. No. 4,501,950. A disadvantage of the known device is that it requires a large space in the lateral direction, which means that it is not suitable for carrying out welding operations in narrow spaces, for example inside car bodies.

If one should attempt to reduce the size of a device of the above-mentioned kind by placing the sensor nearer the welding torch, there will arise problems as to how to protect the sensor against the radiation heat of the welding arc and how to protect the optics from being clogged by the welding smoke. In prior art seam trackers these problems have not found any satisfactory solution.

DISCLOSURE OF THE INVENTION

The object of the present invention is to provide a weld seam tracker, primarily intended for arc welding, of a robust design which allows good accessibility for welding in narrow spaces and in which the optical sensor of the weld tracker is well protected against heat radiation, spatter, visibility deteriorating fumes, etc.

Since the compressed air for cooling of the sensor is supplied thereto via a central, gas-tight space in the seam tracker housing, among other things the advantage is achieved that the compressed air hose can be applied in close proximity to the connection cables for the sensor and the motor and possibly be bundled together with these cables. In this way, cables and hose are better protected against damage which may arise upon contact with objects in the work envelope of the robot, and the maneuverability of the robot in narrow spaces is improved.

BRIEF DESCRIPTION OF THE DRAWING

The invention will be described in greater detail with reference to an embodiment shown in the accompanying drawing, wherein.

DESCRIPTION OF THE PREFERRED EMBODIMENT

Figure 1:
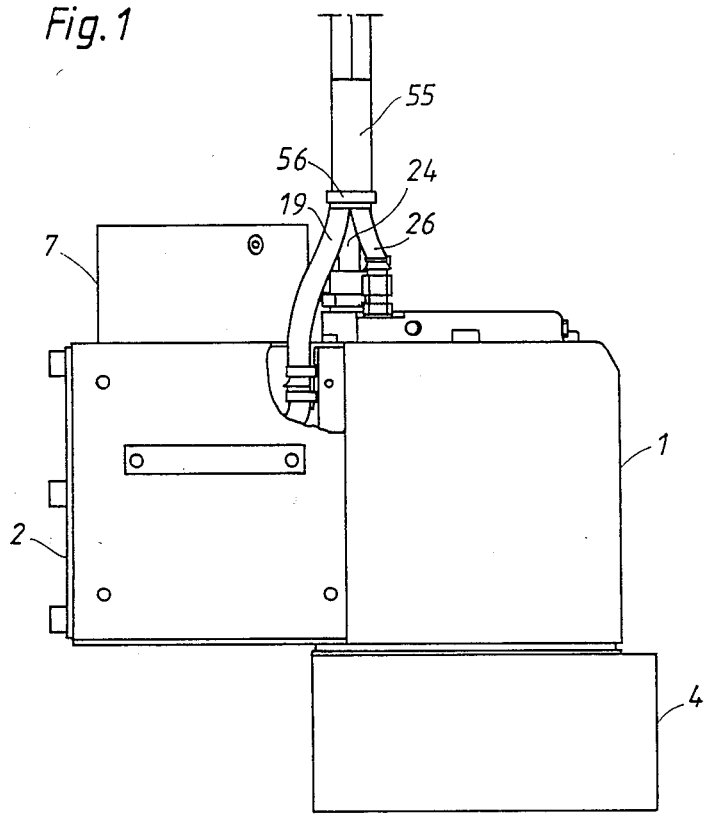
FIG. 1 is a side view of a seam tracker designed according to the invention.
Figure 2:
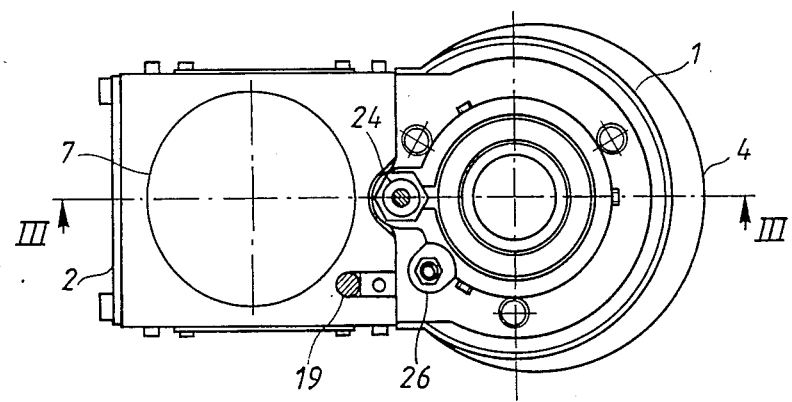
FIG. 2 is a top view of the seam tracker.
Figure 3:
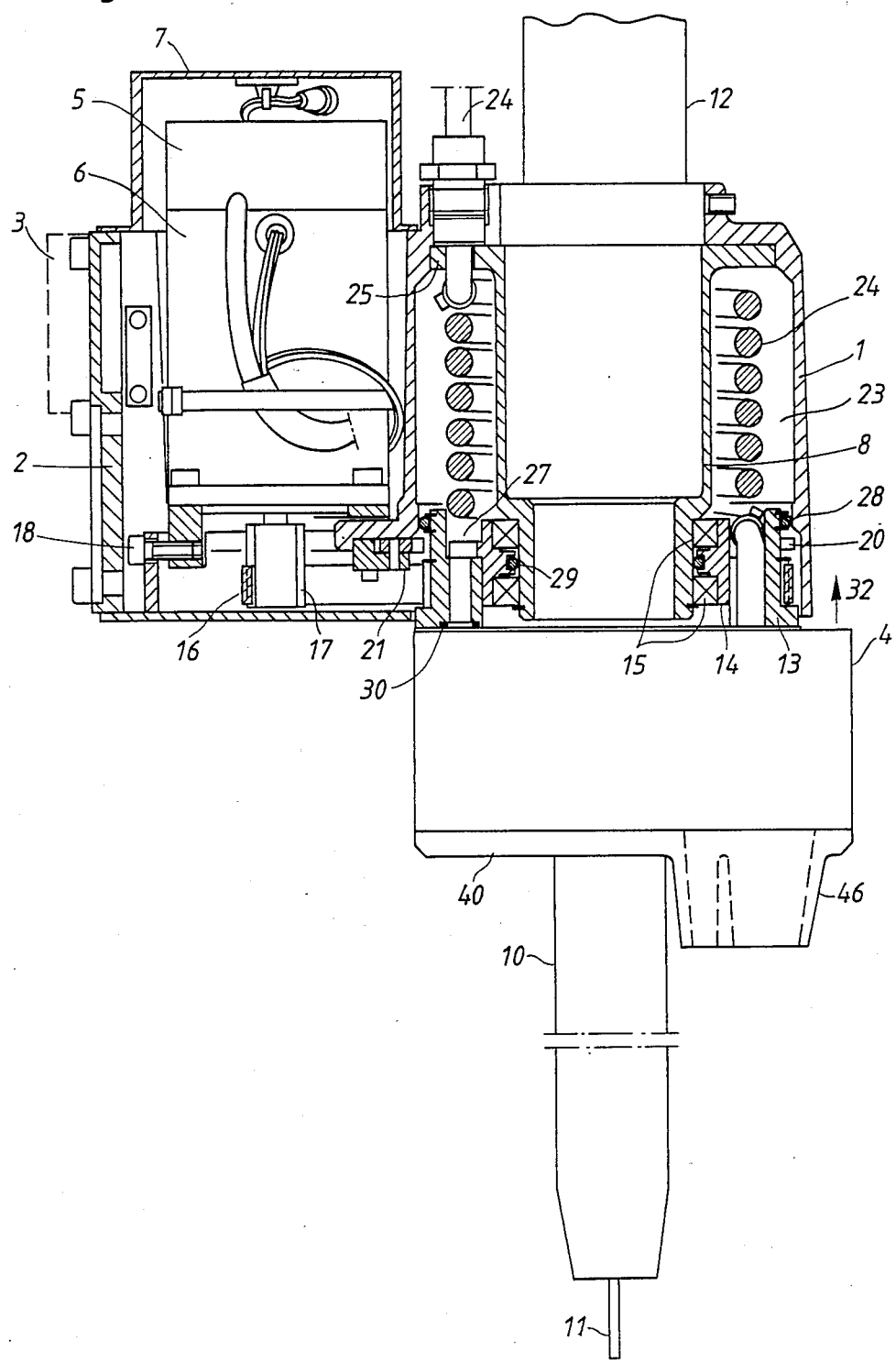
FIG. 3 is a side view of the seam tracker, its turning unit being shown in section along the line III—III in FIG. 2.

The seam tracker shown in FIGS. 1-3 is primarily designed to be used in arc welding by means of an industrial robot of, for example, the design shown in Swedish patent application No. 8602625-9. The seam tracker has a housing 1 cast from light metal, which via an attachment 2 is mounted on the tool attachment 3 of the robot hand. Seam tracking and distance measuring take place with the air of a circular-cylindrical sensor 4, which is turnable in relation to the housing 1 and comprises a semiconductor laser and a position-sensing photodetector. A stepping motor 6, controlled by a pulse transducer 5, for turning the sensor 4, is mounted on the housing 1. The motor 6 is covered by a housing 7.

In that part of the housing 1 located furthest away from the robot hand, which part is substantially circular-cylindrical, an inner sleeve 8 is fixedly mounted. Through this sleeve 8 and through a hole eccentrically located in the sensor 4 there extends a welding torch 10 for arc welding, schematically shown in FIG. 3. The welding electrode 11 of the torch 10 is fed forwards through a hose 12, through which also protective gas is supplied to the welding point.

The sensor 4 is screwed to a toothed wheel 13, which in turn is attached to an inner ring 14, which by means of ball bearing 15 is rotatably journalled on the inner sleeve 8. The wheel 13 is driven via a toothed belt 16 from a gear pinion 17 mounted on the shaft of the motor 6. The belt 16 is tightened with a screw 18 to bring about freedom from backlash in the power transmission between the motor 6 and the sensor 4.

The wheel 13 is provided with a radially projecting pin 20, which cooperates with a stop means, mounted in the housing 1, in the form of a mechanical rocker 21, the movement of the wheel 13 thereby being limited to a maximum of two full turns.

Between the cylindrical wall of the housing 1 and the inner sleeve 8 there is an annular space 23 in which the connection cable 24 to the sensor 4 is loosely and helically wound about the sleeve 8. In this way the cable will not prevent the movement of the sensor 4 and that part of the cable which is nearest the welding zone is well protected in the housing 1.

The annular space 23 has an inlet opening 25, through which the space 23 is supplied with compressed air via a hose 26. The compressed air is forwarded through an outlet opening 27 and into specially arranged cooling air gaps in the sensor 4 for cooling the sensor 4. The main part of the cooling air flows out through an upwardly directed outlet opening in the sensor 4 at the arrow 32.

The space 23 is sealed against air leakage by means of sealing rings 28, 29, 30 as well as seals around hose and cable bushings.

Figure 4:
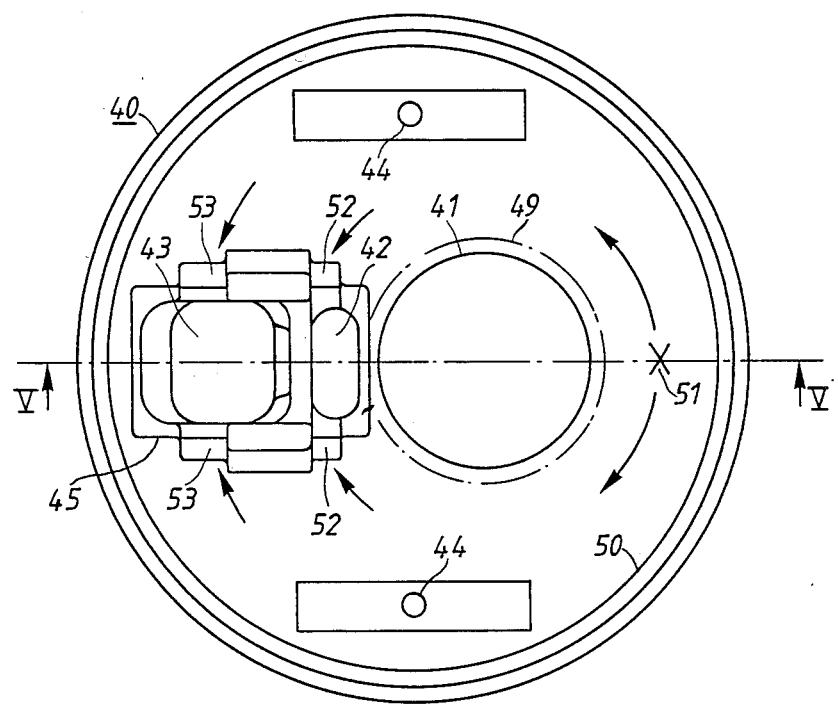
FIG. 4 is a top view of a heat shield for the sensor of the seam tracker.
Figure 5:
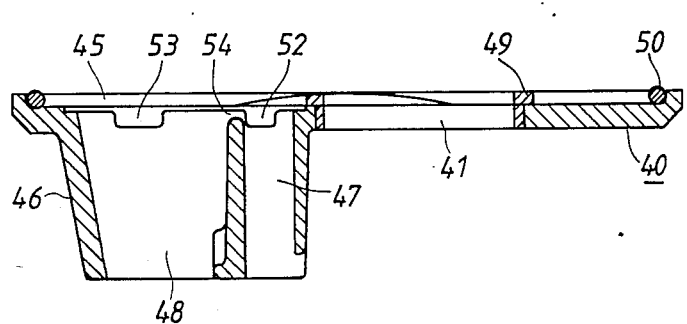
FIG. 5 is a section through the heat shield along the line V—V in FIG. 4.

On the underside of the sensor 4 there is a heat shield 40 in the form of a disc of heat-resistant plastic, the embodiment of which is shown in more detail in FIGS. 4 and 5. The disc has an eccentrically positioned hole 41 for the welding torch 10, openings 42 and 43 for emitted and reflected light, respectively, and mounting holes 44. The openings 42 and 43 are covered with a transparent plate 45 of glass or plastic, placed on the upper side of the heat shield 40, and are protected against spatter, etc., by a sleeve-formed screen 46 projecting on the underside of the heat shield 40 and having separate channels 47 and 48 for emitted and reflected light, respectively.

Between the heat shield 40 and the sensor 4 there are arranged seals 49 and 50 around the hole 41 for the welding torch 10 and around the periphery of the heat shield 40, respectively.

Part of the compressed air which has flows through the cooling air gaps of the sensor 4 is admitted into the gap between the heat shield 40 and the underside of the sensor 4 at the location in FIG. 4 marked by the cross 51. From there the air flows in the direction of the arrows in opposite directions and enters the channels 47 and 48 through openings 52 and 53, respectively, at opposing side edges of the protective plate 45. Through the channels 47, 48 the air flow is directed such that at least that part of the visibility range located nearest the sensor 4 is kept free from fumes, etc. This prevents the fumes from becoming deposited on the protective plate 45. The air quantity that flows out through the light openings of the heat shield 40 must not, of course, be so great as to disturb the protective gas of the welding torch 10. A pressure equalizing opening 54 between the channels close to the glass plate prevents turbulence.

The connection cables 24 and 19 for the sensor 4 and its driving motor, respectively, as well as the compressed air hose 26 are retained by a common hose 55 and a bundle band 56, as will be clear from FIG. 1.

We claim:

1. A seam tracking device which can be mounted on a tool attachment of an industrial robot hand for welding a workpiece, said device comprising a housing which has an open first side intended to face the workpiece and second side opposite said first side, a hose means connected to said housing for supplying compressed cooling air thereto, a sensor means which has a first face and an opposite second face and is rotatably mounted over said first side of said housing such that said second face thereof faces said housing, said sensor means including a hole which extends from said second face to said first face, a light-emitting means for projecting a spot of light on a workpiece, a light-sensing means for sensing reflected light from a workpiece, and channels for accepting compressed cooling air from said housing and causing it to flow therethrough, a motor for rotating said sensor means, a heat shield mounted on said first face of said sensor means, said heat shield including a hole which is aligned with the hole in said sensor means, a window means which covers said light-emitting means and said light-sensing means of said sensor means, and air channels therein which enable compressed cooling air from said sensor means to pass therethrough and then flow in front of said window means, and a welding torch which extends through each of said housing, said hole in said sensor means, and said hole in said heat shield, said welding torch including an electrode which extends towards said workpiece.

2. A seam tracking device according to claim 1, wherein said heat shield includes a sleeve-like screen which is located thereon in register with said window means of said sensor means and extends towards said workpiece.

3. A seam tracking device according to claim 2, wherein said sleeve-like screen provides a first light channel for light to pass from said light-emitting means of said sensor means to said workpiece and a second light channel for light reflected from said workpiece to pass to said light-sensing means of said sensor means.

4. A seam tracking device according to claim 3, wherein said heat shield includes a transparent protective plate in register with said window means and between said first and second light channels and said window means, and wherein said air channels in said heat shield communicate with said first and second light channels adjacent opposite sides of said transparent protective plate.

5. A seam tracking device according to claim 4, wherein said heat shield includes an opening between said first and second light channels for equalizing the air pressures therebetween.

6. A seam tracking device according to claim 1, wherein said housing includes a generally cylindrical sleeve fixedly mounted therein which extends from said second side to said first side thereof, thereby forming an annular space between said sleeve and said housing, wherein said welding torch extends through said sleeve, and wherein said hose is connected to said housing to supply said compressed cooling air to said annular space.

7. A seam tracking device according to claim 6, wherein said sensor means is mounted on a driving wheel which extends into said annular space, and wherein sealing rings are arranged between the wheel and the walls forming said annular space.

8. A seam tracking device according to claim 6, wherein a connection cable to the sensor means passes through said annular space and is loosely wound a plurality of turns in a helical pattern around said sleeve in such a way that the sensor means, from an end position, can be turned at least 360° in relation to the housing.

9. A seam tracking device according to claim 1, including an attachment means connected to said housing for attaching said housing to a tool attachment of an industrial robot hand, and wherein said motor is mounted in said attachment means.

10. A seam tracking device according to claim 1, wherein said welding torch includes a hose element through which said welding electrode is fed and through which a protective gas can flow to the point where welding takes place on the workpiece.

* * * * *